US00RE34109E

United States Patent [19]

Gornstein et al.

[11] E Patent Number: Re. 34,109

[45] Reissued Date of Patent: Oct. 20, 1992

[54] PROPELLER BLADE

[75] Inventors: Robert J. Gornstein, Dockton; Dennis J. Patrick, Seattle, both of Wash.

[73] Assignee: IMC Magnetics Corp., Jericho, N.Y.

[21] Appl. No.: 724,597

[22] Filed: Jul. 1, 1991

Related U.S. Patent Documents

Reissue of:

[64] Patent No.: 4,844,698
Issued: Jul. 4, 1989
Appl. No.: 875,292
Filed: Jun. 17, 1986

[51] Int. Cl.[5] ..... B64C 3/26

[52] U.S. Cl. ..... 416/223 R; 416/242

[58] Field of Search ..... 416/223 R, 223 A, 232, 416/242, 243, DIG. 2, 237; 244/35 R, 35 A; 415/119

[56] References Cited

U.S. PATENT DOCUMENTS

| | | | |
|---|---|---|---|
| 904,656 | 11/1908 | Steiger | 416/242 |
| 2,097,389 | 7/1932 | De Mey et al. | 170/159 |
| 2,561,705 | 7/1951 | Lochman | 416/226 |
| 2,609,055 | 9/1952 | Monroe | 416/223 R |
| 3,167,129 | 1/1965 | Schultz | 416/226 |
| 3,310,117 | 3/1967 | Slivinsky et al. | 416/226 |
| 3,333,642 | 8/1967 | Kee | 416/226 |
| 3,632,065 | 1/1972 | Rosta | 244/17.11 |
| 3,829,240 | 8/1974 | Edenborough et al. | 416/223 R |
| 3,946,688 | 3/1976 | Gornstein et al. | 416/223 R |
| 4,314,795 | 2/1982 | Dadone | 416/223 R |
| 4,373,241 | 2/1983 | Maloof | 416/223 A |
| 4,387,869 | 7/1983 | Englar et al. | 244/207 |
| 4,408,958 | 10/1983 | Schacle | 416/237 |
| 4,413,796 | 11/1983 | Bousquet | 416/DIG. 162 |
| 4,459,083 | 7/1984 | Bingham | 416/223 R |
| 4,498,646 | 2/1985 | Proksch et al. | 244/35 R |
| 4,552,511 | 11/1985 | Sumigawa | 416/242 |

FOREIGN PATENT DOCUMENTS

| | | | |
|---|---|---|---|
| 0103478 | 3/1984 | European Pat. Off. . | |
| 329903 | 5/1930 | United Kingdom | 416/242 |
| 1079606 | 8/1967 | United Kingdom . | |

*Primary Examiner*—Thomas E. Denion
*Attorney, Agent, or Firm*—Christensen, O'Connor, Johnson & Kindness

[57] ABSTRACT

A propeller having blades, designed to achieve maximum thrust at lower static velocities in both forward and reverse pitch modes is disclosed. Each blade has a generous leading edge radius leading to an upper surface having positive camber and a lower surface having positive camber adjacent the leading edge and negative camber adjacent the trailing edge. Each blade also has a high thickness-to-chord ratio and lower span-to-chord ratio or aspect ratio. This thicker blade profile and aft loading leads to a more uniform pressure distribution and laminar airflow across the blade surface resulting in a higher coefficient of lift, increased blade life and reliability, and lower noise levels.

14 Claims, 6 Drawing Sheets

PROPELLER BLADE

Matter enclosed in heavy brackets [ ] appears in the original patent but forms no part of this reissue specification; matter printed in italics indicates the additions made by reissue.

BACKGROUND OF THE INVENTION

This invention relates to propeller blades designed to aerodynamically generate thrust and more particularly to propeller blades used on hovercraft, airboats, dirigibles, or other vehicles requiring maximum thrust at static or low vehicle velocities.

Existing fixed-wing propeller blades and helicopter rotor blades must meet the operational requirements of take-off, climb, cruise, and, in the case of helicopters, autorotation. As a result, current blades are designed to efficiently move aircraft at the relatively high airspeeds necessary to maintain flight. These prior art blades, however, have failed to effectively and efficiently develop the thrust needed to meet the design parameters for vehicles such as hovercraft.

One major drawback of conventional propellers and rotors is the lack of thrust developed at static velocities. This is due to current blade configurations that operate in an over-80-percent-stalled condition at zero velocity. In addition, current blades cannot generate the reverse thrust that hovercraft require to reduce speed, reverse direction, or maneuver. Another significant problem is poor environmental durability. The sand and dust particles, as well as water droplets, which are present around hovercraft operating low to the surface, quickly erode the leading edges and tips of low-profile, high-aspect ratio blades. Finally, prior art blades generate high noise levels due to blade tip speed.

SUMMARY OF THE INVENTION

The present invention provides a propeller blade design that generates a greater maximum thrust at static velocities in both forward and reverse pitch modes than has previously been achieved. Further, the present invention achieves the foregoing and simultaneously lowers the noise level by reducing the tip speed of the propeller blades and decreasing the local sonic velocity over the blade surface. Additionally, the present invention, while still achieving the foregoing, increases the propeller blade life and reliability by reducing erosion and pitting due to the impact of water, sand, and insects. This is accomplished by decreasing the propeller blade tip speed, increasing the thickness of the leading edge of the propeller blade, and achieving a more uniform pressure distribution across the upper surface of the propeller blade.

The foregoing advantages are achieved in accordance with this invention by providing a propeller blade profile having a higher lift coefficient that avoids the blade-stalling condition that can occur at maximum thrust and low or static velocities. This is accomplished by increasing the radius of the leading edge and allowing a greater thickness-to-cord ratio along the span of the propeller blade. In addition, the planform profile of the propeller blade has a lower aspect ratio achieved by shortening the span and increasing the chord of the blade. Further, the contour of the lower propeller blade surface has a positive lower camber adjacent the leading edge but then reverses to a negative lower camber adjacent the trailing edge to provide aft loading. The aft loading and higher blade profile causes a redistribution of the negative pressure across the upper surface by eliminating a sharp or steep negative pressure gradient peak that exists over the leading edge of prior art blades and shifting the negative pressure to apply more evenly across the upper surface of the propeller blade.

In accordance with this invention, a unique propeller blade profile is provided wherein a generous leading edge radius leads to a thicker airfoil cross section having positive upper camber throughout the chord length of the upper surface and both positive and negative lower camber throughout the chord length of the lower surface. In addition, the aspect ratio of the propeller is lower than other propellers to reduce the tip speed while, at the same time, the increased chord length provides greater lift. In addition, a substantially uniform angle of initial pitch is achieved spanwise by nonlinearly varying the twist of the propeller blade from the root to the tip. This substantially uniform pitch avoids propeller blade stalling and more efficiently develops maximum static thrust. Further, the negative lower camber, combined with the greater leading edge radius and increased thickness of the airfoil, increases the aft loading on the propeller blade and lowers and broadens the negative pressure spike or peak on the upper leading edge of the blade. This results in a lower noise level and a decreased amount of erosion on the leading edge of the blade and blade tip from water droplets, dust, insects, and other particles. The increased leading edge radius further allows for the attachment of a protective device along the leading edge of the propeller blade to increase its life.

In the preferred embodiment of this invention the leading edge radius of the propeller blade is relatively large when contrasted with prior blades. The thickness of the blade cross section in terms of chord length varies nonlinearly from about 23 percent at the root to about 9 percent at the tip of the blade. A twist angle is also provided to achieve a uniform pitch spanwise from about 28 degrees at the root to about 6 degrees at the tip. The maximum attainable lift coefficient at static velocities varies nonlinearly spanwise across the blade from a maximum of about 1.7 at the root to about 1.0 at the tip when the blade is rotated to a forward pitch mode, and a maximum attainable negative lift coefficient of about $-1.0$ from the root to the tip when the propeller blade is rotated about the hub to a reverse pitch mode. The aspect ratio varies between 2.0 and 2.2. A substantially uniform negative pressure distribution exists at the tip of the propeller blade and a slightly more rounded and broader negative pressure curve exists at the root.

A practical advantage realized through implementation of this propeller blade design is increased aerodynamic performance. Current propeller systems used on hovercraft limit the vehicle to 50 percent of its design goal speed and 75 percent of its design payload. By utilizing the new propeller blade, which increases aerodynamic performance through increased lift and efficiency, cost rebuilding of hovercraft propulsion systems can be avoided with easier and more economical retrofitting. This unique blade not only gives greater forward speed, but the increased reverse thrust that is available renders hovercraft more maneuverable, easier to stop, and gives greater reverse speed capabilities.

An additional important feature is the increased life and reliability. The larger leading edge radius better prevents chipping and cracking that can occur from erosion and pitting along the leading edge and tip. Durability can be further increased because the leading edge contour provides an excellent shape for attaching a protective device if that proves needed.

Additionally, the blade is safer and quieter. The reduced diameter and tip speed, as well as redistribution of negative pressure gradients, keeps noise levels lower, thus not jeopardizing hearing and being less of a disturbance to crew and passengers. The smaller diameter propeller is also safer because of increased strength and reliability.

Finally, the present invention provides a cost savings as a result of more efficient use of available horsepower and resulting reduction in fuel consumption. The new blade design is easily adaptable to retrofitting on current hubs and propeller systems. No changes would need to be made in drive system or mounting structures. The increased power, maneuverability, and speed would allow hovercraft to operate with greater payloads and capabilities.

BRIEF DESCRIPTIONS OF THE DRAWINGS

Other objects and advantages of the present invention will become apparent to one skilled in the art after a reading of the following description taken together with the accompanying drawings, in which.

Figure 1:
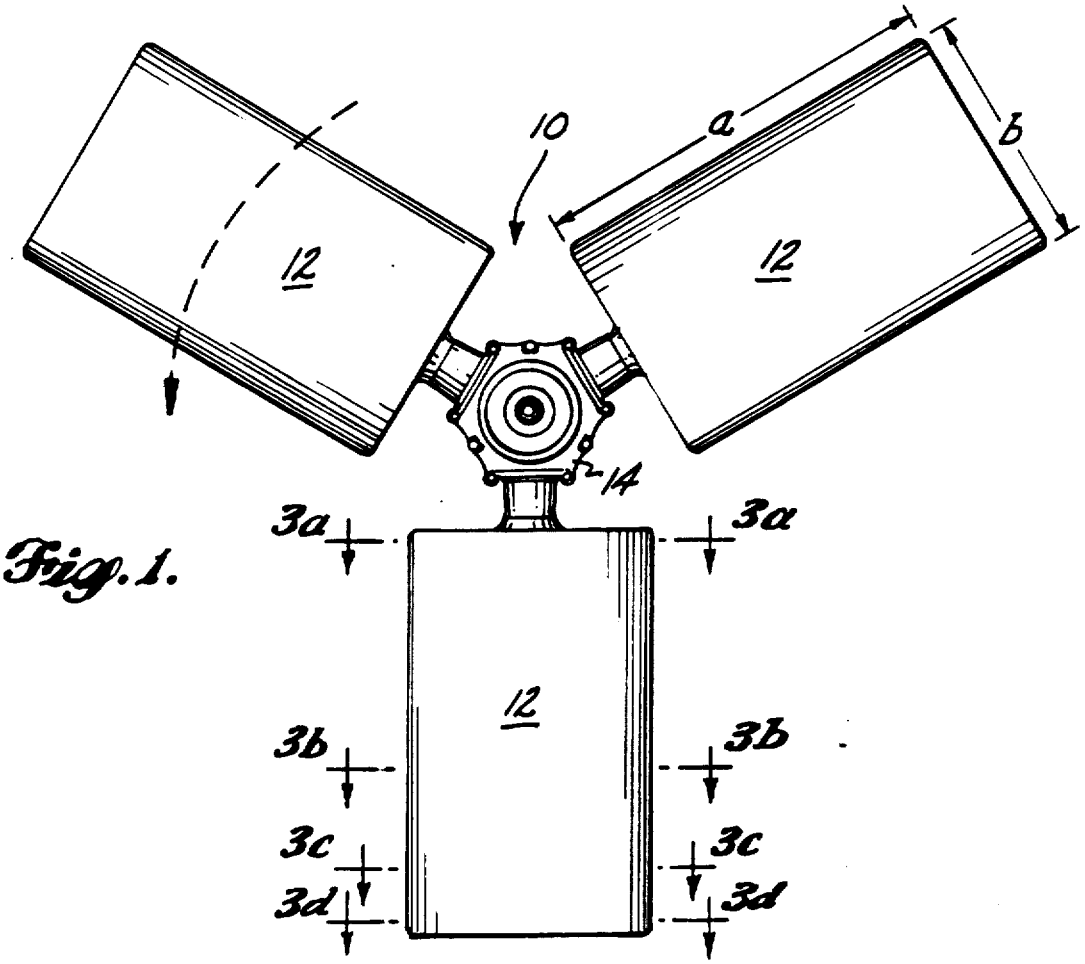
FIG. 1 is a plan view of a propeller showing the upper surface of the attached blades.
Figure 3A:
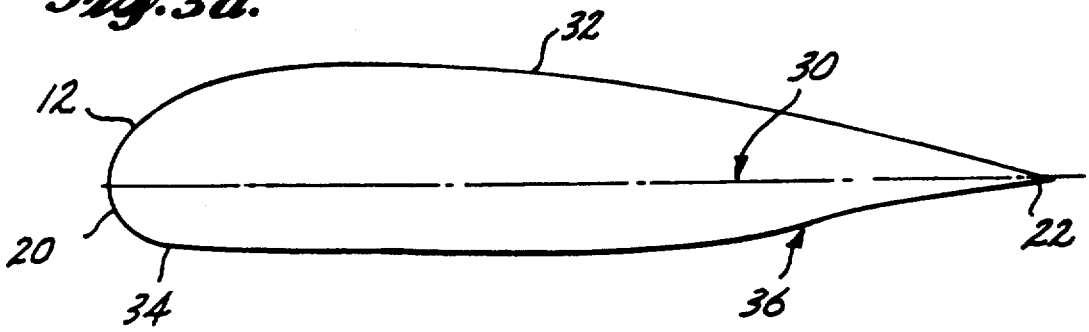
Figure 3B:
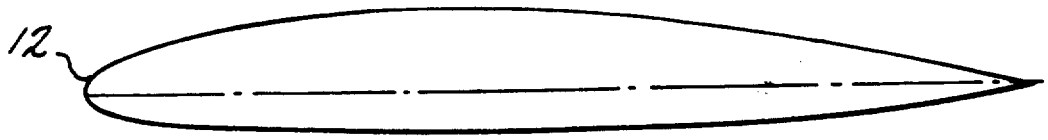
Figure 3C:
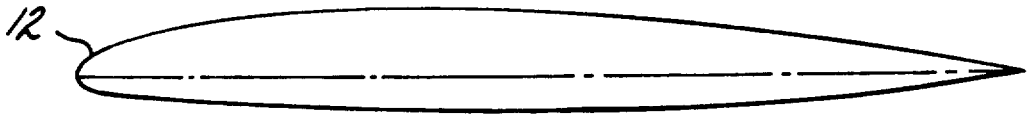
Figure 3D:
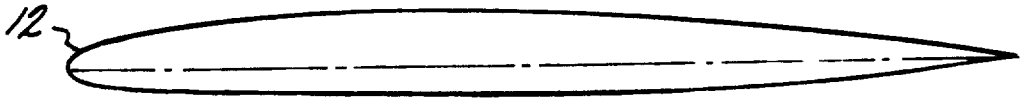
Figure 4:
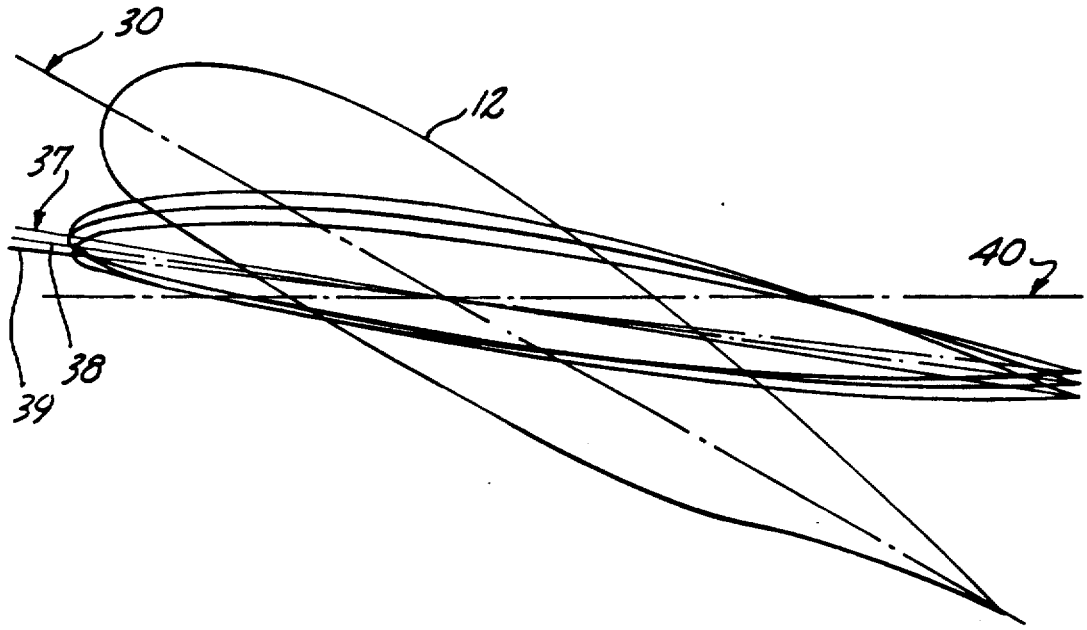
Figure 5:
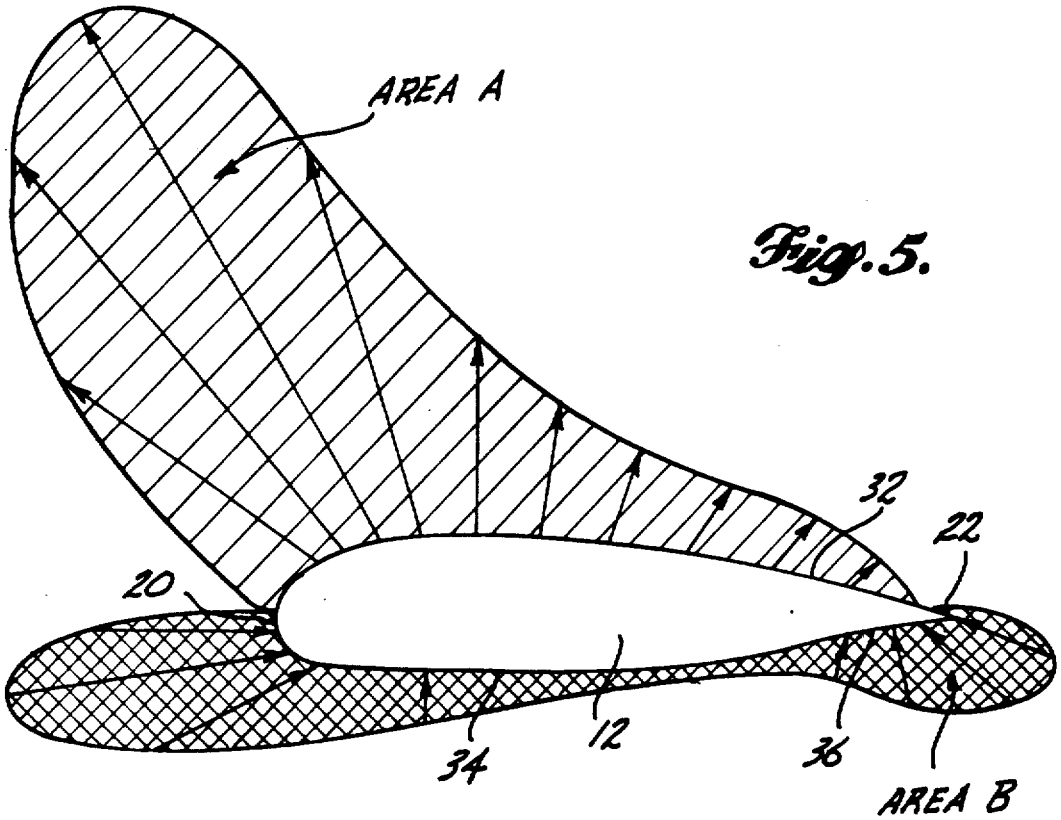
Figure 6:
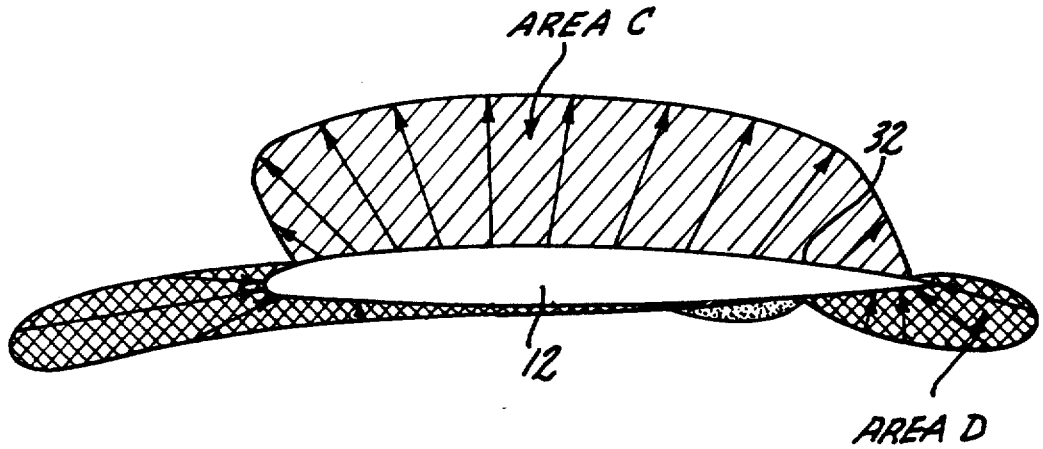
Figure 7:
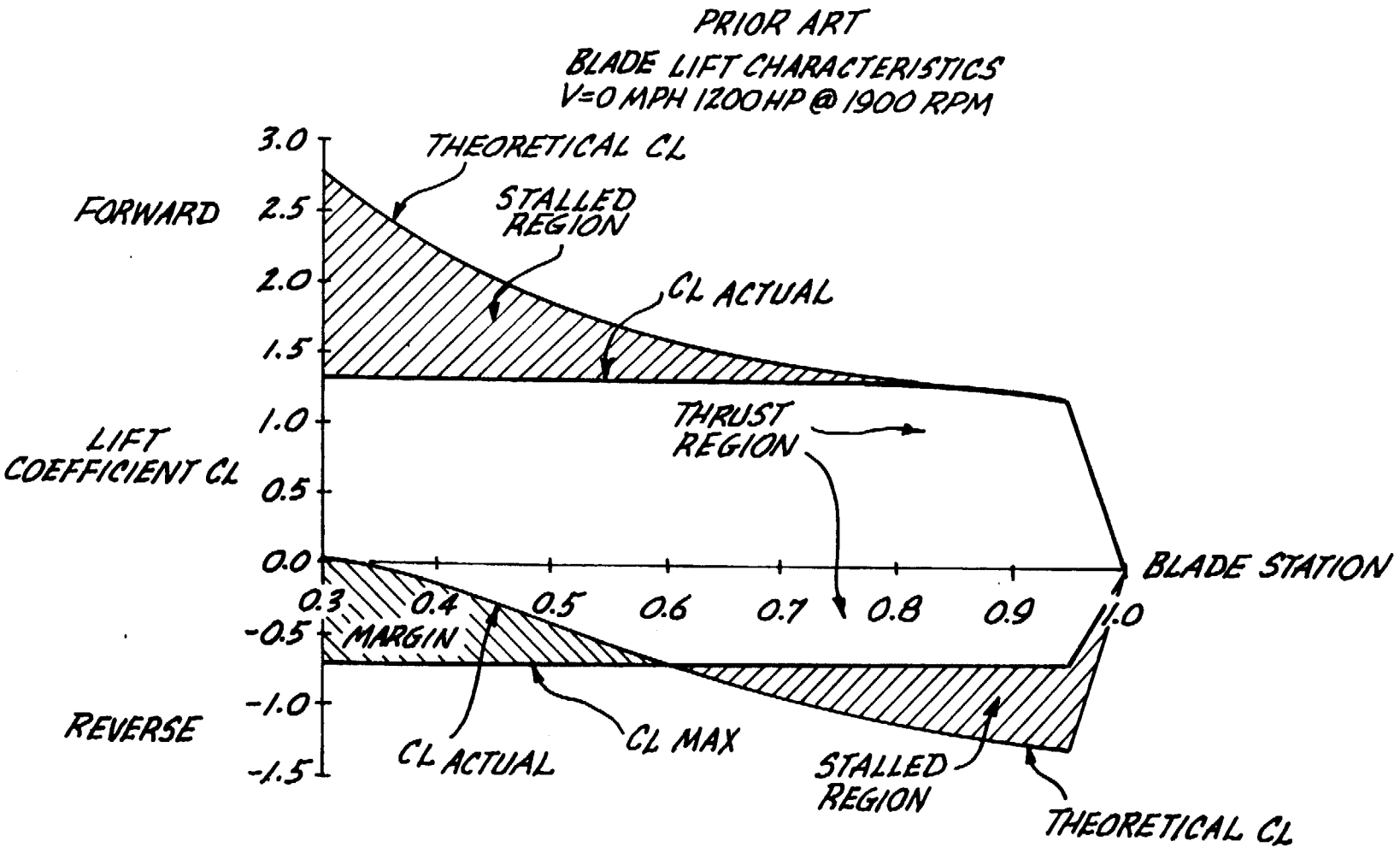
Figure 8:
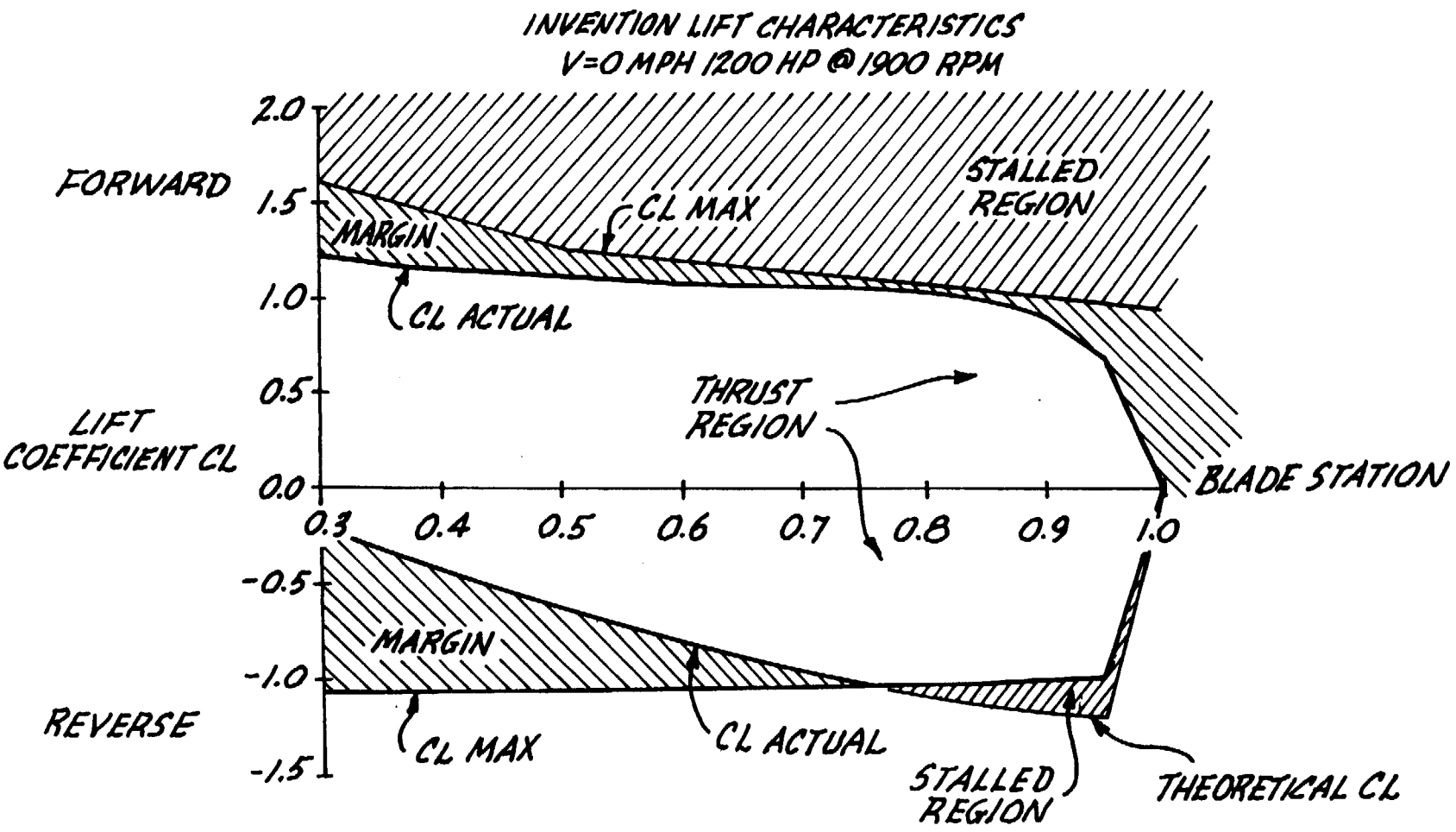

FIGS. 3a through 3d are four cross-sectional contours of the propeller blade taken along section lines 3a—3a through 3d—3d of FIG. 1;

FIG. 4 shows the cross-sectional contours of FIGS. 3a-3d superimposed on one another;

FIG. 5 is a cross-sectional illustration of the pressure distributions at the root station of the propeller blade;

FIG. 6 is a cross-sectional illustration of the pressure distributions at the tip station of the propeller blade;

FIG. 7 is a graph illustrating the lift characteristics of a prior art propeller blade; and FIG. 8 is a graph illustrating the lift characteristics of the present invention.

DETAILED DESCRIPTION

Referring to FIG. 1, a propeller 10 has blades 12 mounted to hub 14. Although a three-bladed configuration is shown, it is to be understood that other configurations such as two-bladed propellers or four-bladed propellers may be used without departing from the spirit of the present invention. In addition, blades 12 may either be rotatably or fixedly mounted to hub 14, although blades 12 are optimally designed to operate in a forward- and reverse-pitch mode, thus requiring rotation.

The unique planform profile of blade 12 is typically measured as an aspect ratio or the ratio of the span of blade 12, represented by line a, divided by the chord of blade 12, represented by line b. The present invention achieves greater thrust at lower static velocities by having a chord length varying from 18 inches to 26 inches and, more preferably, a constant chord length of about 21 inches spanwise, and by having a radius measured from hub 14 varying between 40 inches to 60 inches, and more preferably a constant span along leading edge 20 and trailing edge 22 of 45 inches. This corresponds to an aspect ratio in the range of 1.5 to 3.3 and preferably in the range of 2.0 to 2.20.

Figure 2:
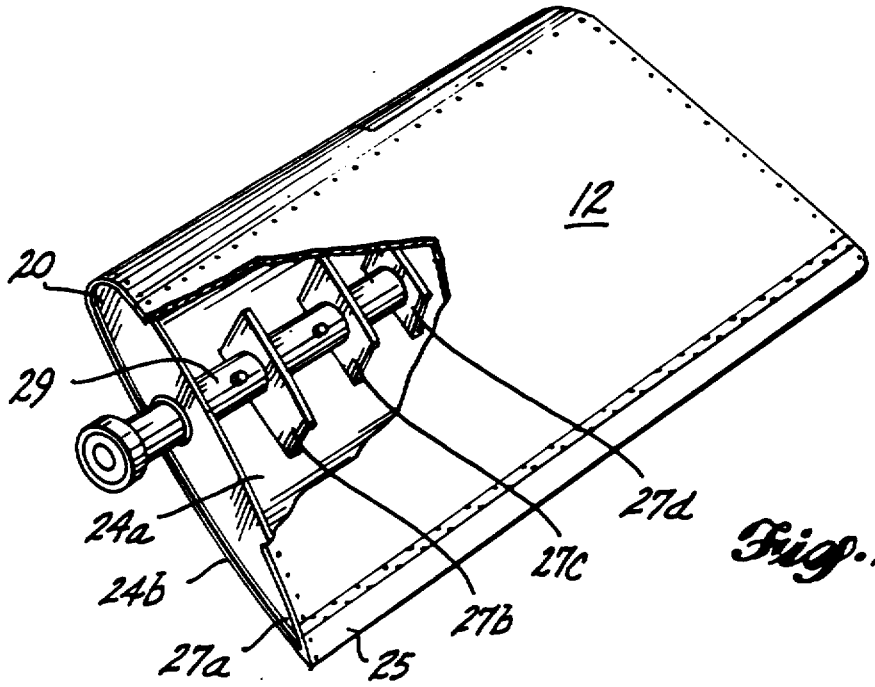
FIG. 2 is a cross-sectional view of a propeller blade.

Referring now to FIG. 2, the currently preferred construction of the propeller blade 12 is illustrated. Basically, the blade 12 has a moncoque shell with a leading edge bull nose 20 that is configured in accordance with the aerodynamic requirements of the blade. Upper and lower skins 24a and 24b are fixed in a conventional manner to the bull nose 20 and extend rearwardly to a trailing edge extrusion 25 configured again in accordance with the aerodynamic requirements of the blade. The trailing edge extrusion 25 is joined to the upper and lower skin 24a and 24b again by conventional fasteners. The outer tip of the wing carries a conventional fairing. The blade 12 has a full rib 27a at its root and partial ribs 27b, 27c and 27d at spanwise locations outwardly from the root rib 27a. Ribs 27b and 27c are located at spanwise stations 16 inches and 22 inches from the center of rotation. The last rib 27d is positioned approximately midspan of the blade 12. A cylindrical spar or torque tube 29 extends up the center of the blade through apertures in root rib 27a and partial ribs 27b, 27c and 27d. The torque tube terminates inwardly from the root in a conventional blade shank 29 that couples in a conventional manner to the blade hub.

Referring now to FIGS. 3a through 3d, four sections of blade 12 at various stations along its span are illustrated FIG. 3a is taken at the root station; FIG. 3b is taken at an inboard station; FIG. 3c is taken at the outboard station; and FIG. 3d is taken at the tip station. In the embodiment shown, the root, inboard, outboard, and top profiles are taken at 10, 32, 38, and 45 inches, respectively, from the center of rotation.

Referring first to FIG. 3a, blade 12 has a leading edge 20 and trailing edge 22. Chord line 30 represents the distance from the outside of leading edge 20 to the outside of trailing edge 22. Upper surface 32 defines the upper camber of blade 12 and lower surface 34 defines the lower chamber of blade 12. The radius of leading edge 20 and the magnitude of the upper and lower camber, as measured relative to chord 30, will determine the maximum lift potential of the blade, denominated as the coefficient of lift. The upper camber is a distance typically measured from upper surface 32 perpendicularly to chord 30, at its greatest point; and the lower camber is typically measured from lower surface 34 perpendicularly to chord 30, at its greatest point. Positive camber occurs when a surface maintains a convex curve away from chord 30, and negative camber occurs when a surface maintains a concave curve toward chord 30 as illustrated by curve 36 along lower surface 34.

The present invention achieves a higher coefficient of lift than prior art blades by having an upper surface that defines a positive camber throughout the chord length of blade 12, and having both a positive and negative lower camber along the chord length of blade 12. Adjacent the root, positive lower camber should preferably occur within the first 65 percent of the chord length measured adjacent leading edge 20; and negative lower camber should preferably occur in the remaining 35 percent of the chord length adjacent trailing edge 22 as shown by curve 36. This negative camber adjacent the root progresses to a positive camber between the root and inboard sections.

Another important ratio in evaluating lift and efficiency is the thickness of the cross section profile between upper surface 32 and lower surface 34, typically measured perpendicularly through chord 30 at the point of greatest distance. In the present embodiment, the thickness-to-chord ratio of blade 12 would vary nonlinearly spanwise from about 23 percent at the root station to about 9 percent at the tip station. The cross-sectional profile of the blade is accurately depicted at stations 10, 32, 38 and 45, respectively. The curvature of the upper and lower surfaces at each of those stations is accurately defined by the following formula:

$$y = a\sqrt{x} + bx + cx^2 + dx^3 + ex^4 + fx^5$$

wherein x is the location on the chord measured from the leading edge and y is the distance of the upper or lower surface from the chord line. The parameters a,b, c,d,e, and f are set forth in Table I below:

TABLE

| | Station 10 | Station 32 | Station 38 | Station 45 |
|---|---|---|---|---|
| | | UPPER SURFACE | | |
| a | .23766 | .15921 | .16177 | .11887 |
| b | .15650 | .12547 | −.013454 | .0068211 |
| c | −1.4017 | −.78829 | −.31984 | −.29976 |
| d | 2.3766 | 1.3817 | .54537 | .52469 |
| e | −2.0787 | −1.4758 | −.66596 | −.5987 |
| f | .70347 | .59913 | .29375 | .24937 |
| | | LOWER SURFACE | | |
| a | −.3381 | −.1769 | −.13873 | −.12229 |
| b | .5976 | .30416 | .22654 | .20148 |
| c | −.62181 | −.55967 | −.44032 | −.41682 |
| d | −.33374 | .95425 | .78215 | .77721 |
| e | 1.6804 | −.92532 | −.7364 | −.72913 |
| f | −.99487 | .40228 | .30649 | .28928 |

Referring now to FIG. 4, the four section profiles are overlaid to illustrate the geometric twist using the plane of rotation of the blade 40 as a reference. Root chord 30 is the chord at the root station; inboard chord 37 is the chord at the inboard station; outboard chord 38 is the chord at the outboard station; and tip chord 39 is the chord at the tip station of blade 12. The twist angle, local sonic velocity and Reynold's number at each station along the span of the blade is set forth in the following Table II:

TABLE II

| Station | Location | Twist | MI | Reynold's No. (× $10^6$) |
|---|---|---|---|---|
| Root | 10 | +27.5° | 0.05 | 0.7 |
| Inboard | 32 | +9.2° | 0.32 | 4.0 |
| Outboard | 38 | +7.5° | 0.47 | 6.6 |
| Tip | 45 | +6.5° | 0.64 | 8.0 |

The location represents the radial distance in inches of a given station from the center of the hub 14. Twist is the initial fixed angle of incidence with respect to the plane of rotation at each of the stations. Typically, the angle is positive when leading edge 20 is higher than trailing edge 22. In Table I the twist angle is measured between chord 30 and reference plane 40. M1 is the free stream local sonic velocity measured at a given station. The Reynold's number represents the airflow characteristics at each blade station.

Referring to FIGS. 5 and 6, the positive and negative pressure distributions achieved by the present invention are shown diagrammatically. FIG. 5 illustrates the blade profile at the root station as having a negative pressure distribution over upper surface 32 substantially as shown by Area A. Adjacent the leading edge, the negative pressure peak of Area A is significantly lower and broader than has been achieved by prior art blades. The lower and broader peak leads to a lower local sonic velocity resulting in a quieter blade. Moreover, shock-wave producing peaks or spikes are eliminated, also leading to a quieter blade. The magnitude of the negative pressure decreases near the trailing edge, but still provides substantial loading adjacent the trailing edge, which increases blade efficiency. Area B represents the positive pressure distribution across the lower surface 34. Negative camber curve 36 creates greater positive pressure under trailing edge 22. This aft loading helps to further reduce the negative pressure peak over leading edge 20 and shift some negative pressure over upper surface 32 adjacent trailing edge 22.

The positive and negative pressure distribution over the tip station of blade 12 is shown in FIG. 6. Area C represents the negative pressure distribution over upper surface 32. The pressure distribution is substantially uniform across the entire chord length of upper surface 32, which keeps drag lower than current blades and minimizes boundary layer separation, especially over trailing edge 22. Prior art blades have failed to achieve this laminar airflow under static or low velocities, resulting in a stalled condition and increased drag and decreased performance.

FIGS. 7 and 8 provide a comparison of the lift characteristics for prior art airfoils, such as the Clark Y and NACA 16 series airfoils, currently used in hovercraft propeller systems, and the lift characteristics of a propeller constructed in accordance with the present invention. Referring first to FIG. 7, the lift coefficient is plotted versus spanwise blade station shown in increments with the value 1 being at the blade tip and value 0.3 being adjacent the root. The theoretical coefficient of lift for the prior art blade is calculated in accordance with the blade element method and provides the spanwise distribution of the theoretical maximum coefficient of lift. The theoretical coefficient of lift is calculated at static conditions, that is a zero velocity, with the application of 1,200 horsepower at 1,900 RPM. The calculations are conducted in a forward and reverse thrust mode with a blade setting of 18° and −24°, respectively, at the 0.8 station.

The line labeled $C_L$ MAX is the maximum coefficient of lift that can actually be developed under these operating conditions. The region between the $C_L$ MAX line and the theoretical coefficient of lift line represents the region over which the prior art blade is stalled. As can readily be observed, in the forward thrust mode, the prior art blades are typically stalled over greater than 60 to 70% of the blade span. Similarly, in reverse thrust mode, the prior art blade because of its cross section is rather inefficient, generating a maximum actual coefficient of lift of about 0.7. Again, as can be observed, the prior art blade is stalled over about 50% of its span in the reverse operating mode.

If more horsepower of RPM or both were applied in the reverse mode, the maximum coefficient of lift would change little. The theoretical coefficient of lift, however, moves downwardly thus increasing the stalled region and decreasing the efficiency of the blade. In the reverse mode, the region between the $C_L$ MAX and the theoretical coefficient of lift represents a margin whereby increased horsepower does not result in increased stall. However, since the theoretical coefficient of lift line will actually move downwardly, the percentage of the blade which is stalled will increase with increased application of power.

Referring to FIG. 8, the lift characteristics of a blade constructed in accordance with the present invention at the same operating conditions as the prior art blade are illustrated. The graphs are generated for forward and reverse modes at blade settings of 23° and −30°, respectively, at station 0.8. In the forward thrust mode, the blade constructed in accordance with the present invention is designed so that at the operating conditions tested, the theoretical coefficient of lift as well as the actual coefficient of lift achievable under those conditions is approximately the same. Thus, no portion of the blade in the forward thrust mode is operating in a stalled region. If, however, additional horsepower or RPM or both were applied to the blade constructed in accordance with the present invention, the theoretical as well as the actual coefficient of lift will increase, thus moving $C_L$ ACTUAL up toward the line labeled $C_L$ MAX. The latter line represents the maximum coefficient of lift achievable prior to stalling the wing, with a blade designed in accordance with the invention. Thus, it can be seen that the coefficient of lift of the blade constructed in accordance with the present invention is approximately the same of that of the prior art blades. However, since none of the blade constructed in accordance with the present invention is operating in a stalled condition, the blade is operating in a much more efficient mode resulting in a higher thrust output for a given power input.

In the reverse thrust mode, the blade is designed so that the maximum achievable coefficient of lift is about 1.0 across the entire span of the blade. Again, at these operating conditions, the actual coefficient of lift and the theoretical coefficient of lift are again about the same. Under these conditions, only about 25–30% of the blade is operating in the stalled region with the remainder of the blade operating under lift conditions that are significantly greater than those achievable by prior art blades. Thus, one of the most important characteristics of the blade constructed in accordance with the present invention is fully observable, that is, it has very superior reverse thrust characteristics.

Having described the invention in its preferred embodiment, it is to be realized that changes and modifications therein may be made without departing from the essential concepts representing the advancements in this art. For example, shrouding the propeller will further increase thrust by preventing spillage of air spanwise over the tip. Shrouding also affords greater protection from physical injury to crew or passengers. It is therefore intended that the scope of the claims that follow be limited by their definitional terms and equivalents thereof.

The embodiments of the invention in which an exclusive property or privilege is claimed are defined as follows:

1. A propeller comprising a plurality of blades, each of said blades having a root, a tip, a leading edge, a trailing edge, means defining an upper surface that is contoured and constructed adjacent said tip to achieve a substantially uniform negative pressure profile chordwise across said upper surface, means defining an upper surface that is contoured and constructed adjacent said root to achieve a negative pressure profile that has a broad, rounding peak preceding the leading edge and that decreases toward the trailing edge point on said upper surface means, and said means defining an upper surface and means defining a lower surface further being constructed and oriented to provide a twist to said propeller that defines a substantially uniform pitch spanwise from said root to said tip, said means defining an upper surface and said means defining a lower surface being further constructed and contoured to achieve a positive lift coefficient [greater than] *of* about 1.7 *maximum* at said root and [greater than] *of* about 1.0 *maximum* at said tip, said lift coefficient varying nonlinearly spanwise when each of said blades is in a forward pitch mode, and to achieve a negative lift coefficient greater than about −1.0 from said root to said tip, said negative lift coefficent varying nonlinearly spanwise when each of said blades is in a reverse pitch mode.

2. The propeller of c'aim 1, wherein said means defining an upper surface is further contoured and constructed to have an airfoil cross section with a positive upper camber throughout the chord length of each of said blades.

3. The propeller of claim 2, wherein said means defining a lower surface further is constructed and contoured to have both positive lower camber adjacent the leading edge of said blade and negative lower camber adjacent the trailing edge of said blade.

4. The propeller of claim 3, wherein said means defining a lower surface being further constructed and contoured to have a positive lower camber occurring within the leading 65 percent of the chord length measured from said leading edge, and a negative lower camber occurring within the trailing 35 percent of the chord length of each of said blades.

5. The propeller of claim 4, further comprising a hub, each of said blades being rotatably mounted on said hub for rotation about a radial axis.

6. The propeller of claim 1, wherein each of said blades is constructed and contoured to achieve a planform profile having an aspect ratio between about 2.0 and about 2.2.

7. The propeller of claim 6, wherein said blades are further constructed and contoured to achieve a planform profile having a thickness-to-chord ratio varying nonlinearly spanwise between about [21] *23* percent at said root and about [10] *9* percent at said tip.

8. A propeller comprised of a plurality of blades, each of said blades having a root, a tip, a leading edge, a trailing edge, means defining an upper surface, and means defining a lower surface being constructed and oriented to provide a twist to said propeller, which defines a substantially uniform pitch spanwise from said root to said tip, and said means defining an upper surface that is contoured and constructed adjacent said tip to achieve a negative pressure profile chordwise across said upper surface substantially as shown in FIG. 6, wherein area [A] *C* is a representation of the negative pressure distribution over said means defining an upper surface adjacent said tip, and said means defining an upper surface being further constructed and contoured adjacent said root to achieve a negative pressure profile chordwise across said upper surface substantially as shown in FIG. 5, wherein area [C] *A* is a representation of the negative pressure distribution over said means defining an upper surface at said root, said means defining an upper surface and said means defining a lower surface being further constructed and contoured to achieve a positive lift coefficient [greater than] *of* about 1.7 *maximum* at said root and [greater than] *of* about 1.0 *maximum* at said tip, said negative lift coefficient varying nonlinearly spanwise when each of said blades is in a forward pitch mode, and to achieve a negative lift coefficient greater than about −1.0 from said root to said tip, and said negative lift coefficient varying nonlinearly spanwise when each of said blades is in a reverse pitch mode.

9. The propeller of claim 8, wherein said means defining an upper surface is further constructed and contoured to have an airfoil cross section achieving a positive upper camber throughout the chord length of each of said blades.

10. The propeller of claim 9, wherein said means defining a lower surface area is further constructed and contoured to have an airfoil cross section achieving both positive lower camber adjacent said leading edge of said blade and negative lower camber adjacent said trailing edge of said blade.

11. The propeller of claim 10, wherein said positive lower camber occurs within the leading 65 percent of the chord length as measured from said leading edge, and said negative lower camber occurring within the trailing 35 percent of the chord length of each of said blades.

12. The propeller of claim 11, further comprising a hub, each of said blades being rotatably mounted on said hub for rotation about a radial axis.

13. The propeller of claim 8, wherein each of said blades is further constructed and contoured to achieve a planform profile having an aspect ratio between about 2.0 and about 2.2.

14. The propeller of claim 13, wherein each of said blades is further constructed and contoured to achieve a planform profile having a thickness-to-chord ratio varying nonlinearly spanwise between about [21] *23 percent at said root and about* [10] *9* percent at said tip.

* * * * *